United States Patent [19]

Kojimoto et al.

[11] 4,199,106
[45] Apr. 22, 1980

[54] IRRIGATION HOSE

[75] Inventors: Susumu Kojimoto, Takatsuki; Takami Sato, Toyonaka; Junji Ono, Takatsuki; Toshio Mori, Toyonaka; Shigeharu Suzuki, Settsu, all of Japan

[73] Assignee: Sumitomo Chemical Company, Limited, Osaka, Japan

[21] Appl. No.: 929,414

[22] Filed: Jul. 31, 1978

[30] Foreign Application Priority Data

| Aug. 12, 1977 [JP] | Japan | 52-97228 |
| Mar. 6, 1978 [JP] | Japan | 53-25878 |
| Mar. 10, 1978 [JP] | Japan | 53-31009[U] |

[51] Int. Cl.$^2$ .............................................. B05B 15/00
[52] U.S. Cl. .................................... 239/542; 239/547
[58] Field of Search ............... 239/145, 266, 450, 542, 239/547; 138/40, 42, 111

[56] References Cited

U.S. PATENT DOCUMENTS

| 3,361,359 | 1/1968 | Chapin | 239/145 |
| 3,467,142 | 9/1969 | Boyle et al. | 239/450 X |
| 3,672,571 | 6/1972 | Goodricke | 239/145 |
| 3,951,345 | 4/1976 | Mehoudar | 239/542 |
| 4,009,832 | 3/1977 | Tiedt | 239/542 |
| 4,047,995 | 9/1977 | Leal-Diaz | 239/542 X |

FOREIGN PATENT DOCUMENTS 2356986  6/1976  France ............................. 239/542

*Primary Examiner*—Johnny D. Cherry
*Attorney, Agent, or Firm*—Stevens, Davis, Miller & Mosher

[57] ABSTRACT

In an irrigation hose which is produced by melt-sticking double thermoplastic resin film in a plane along longitudinal parallel lines so as to form 2 to 3 passages, one a supply passage and others being constant pressure passages, the supply passage being connected to each constant pressure passage by communicating holes which are formed by non-melt-stuck portions spaced in the melt-stuck line between both passages, and the constant pressure passage having water-irrigating holes which are formed by non-melt-stuck portions spaced in an outside melt-stuck line thereof, the improvement which comprises making small melt-stuck portions in the vicinity of the communicating holes and/or water-irrigating holes.

8 Claims, 10 Drawing Figures

IRRIGATION HOSE

The present invention relates to an improved irrigation hose of synthetic resin film. More particularly, the present invention relates to an irrigation hose of synthetic resin film which is improved in uniformity of water-irrigating by allowing communicating holes and water-irrigating holes to open easily and uniformly not only on a level field but also on a sloping field.

Recently in the agricultural field, irrigation, fertilization, prevention and extermination in fields and greenhouses have been carried out systematically for the purpose of saving labor and improving in efficiency. There are two systematic methods, a sprinkler system and a drip irrigation system, both of which have advantages in certain instances. The drip irrigation system is much superior in effective use of water and efficiency of irrigation, and further it does not change soil structure. Consequently, the use of the drip irrigation system is continually expanding.

The term "drip irrigation system" refers to one which comprises placing a hose or tube having holes in the longitudinal direction very close to crops and irrigating water from the holes little by little over a long period of time by pumps or a head of water. At present, various types of irrigation hose of this system are in use. With the hoses, however, uniform water-sprinkling along the length thereof can not be attained because the water pressure varies over a wide range depending upon the distance from the water source. Similarly, uniform water-sprinkling can not be attained on a sloping field because the amount of water sprinkled is larger on the lower side due to the slope of the ground.

In order to overcome these problems, a synthetic resin irrigation hose has been proposed which is produced by melt-sticking double thermoplastic resin film in a plane at longitudinal and parallel lines so as to form 2 to 3 passages, one of which is a supply passage and the others a constant pressure passage. The supply passage and a constant pressure passage are connected by communicating holes which are formed by a non-melt-stuck portion spaced in the melt-stuck line between both passages, and the constant pressure passage has water-irrigating holes which are formed by a non-melt-stuck portion spaced in the outside melt-stuck line thereof.

In some respects this irrigation hose is an improvement over conventional hoses. Since, however, the communicating holes and water-irrigating holes are formed by non-melt-stuck portions properly spaced in the longitudinal melt-stuck lines, both holes are very difficult to open in practical use. High water pressure is therefore necessary to irrigate water through the water irrigating holes. When use of this irrigation hose with high water pressure is continued for a long period of time, the hose gradually extends becoming thin, and finally it bursts and becomes unusable. Further, the high water pressure produces a speed of water irrigated from the holes which is too high for drip irrigation system. Also, since the water is irrigated with a high speed, it digs soil and allows the roots of planted crops to be exposed to air causing, in the worst case, the crops to die.

Further, this type of irrigation hose has been found to also posses the following drawbacks: The cross-sectional shape of holes changes significantly, on account of hole structure, depending upon water pressure, so that the amount of water irrigated largely depends upon the water pressure. Consequently, the amount of water irrigated is largely affected by the incline which occurs when hose is used on the sloping ground. And in an extreme case, water-irrigation is possible on the lower side of a slope, but not on the higher side since the holes do not open.

The inventors extensively researched the noted problems and have devised an irrigation hose which overcome them.

Accordingly, an object of the present invention is to provide an irrigation hose of synthetic resin film which assures uniform water-irrigation on both level and sloping fields.

Another object of the present invention is to provide an irrigation hose which is easy to handle and cheap.

Other objects and advantages will become apparent from the following description.

According to the present invention, in an irrigation hose which is produced by melt-sticking double thermoplastic resin film in a plane at longitudinal and parallel lines so as to form 2 to 3 passages, one of which is a supply passage and others are a constant pressure passage, the supply passage and constant pressure passage being connected by communicating holes which are formed by a non-melt-stuck portion spaced in the melt-stuck line between the both passages, and the constant pressure passage having water-irrigating holes which are formed by a non-melt-stuck portion spaced in the outside melt-stuck line thereof, there is provided an irrigation hose characterized by making small melt-stuck portions in the vicinity of the communicating holes and/or water-irrigating holes.

Next, the irrigation hose according to the presen invention will be illustrated with reference to the accompanying drawings, which are however only given for the purpose of illustration and not to be interpreted as limiting the invention thereto.

Figure 8:
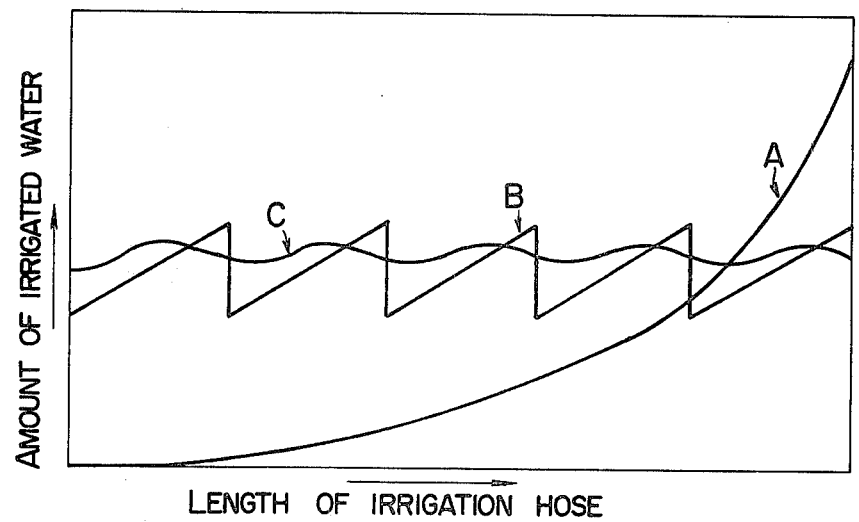

FIG. 8 is a diagram illustrating a water-irrigating condition of three irrigation hoses of the present invention on a sloping field. In FIG. 8, A shows the case of the irrigation hose having no barriers in the constant pressure passage, B shows the case of the irrigation hose having a completely intercepted constant pressure passage, and C shows the case of the irrigation hose having barriers 9 in the constant pressure passage 3 and having a communicating hole 10 through said barriers 9.

Figure 9:
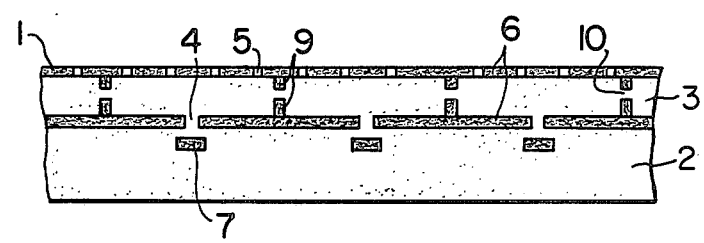

FIG. 9 is a plan view illustrating one example of the irrigation hose of the present invention in which a communicating hole is made through the barriers in the constant pressure passage.

Figure 10:
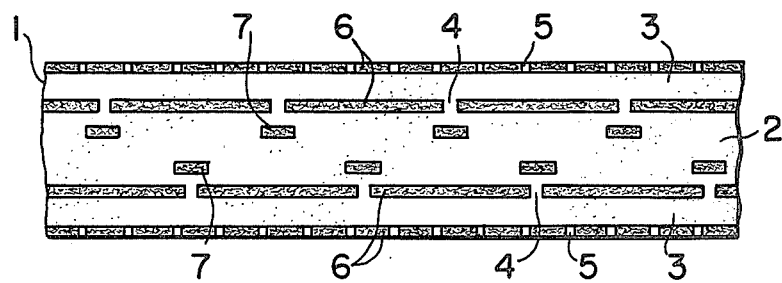

FIG. 10 is a plan view illustrating one example of the irrigation hose of the present invention having three passages on the same plane.

In the drawings, 1 is a wall of synthetic resin film, 2 is a supply passage, 3 is a constant pressure passage, 4 is a communicating hole between the supply passage 2 and the constant pressure passage 3, 5 is a water-irrigating hole made at the outside of the constant pressure passage 3, 6 is a melt-stuck line for forming the supply passage 2 and the constant pressure passage 3, 7 is a small melt-stuck portion made in the vicinity of the communicating hole 4 in the both passages, 8 is a small melt-stuck portion made in the vicinity of the water-irrigating hole 5 in the constant pressure passage 3, 9 is a barrier made in the constant pressure passage 3 and 10 is a communicating hole made in the barrier 9. The communicating hole 4 and water-irrigating hole 5 are formed by non-melt-stuck portions made in the melt-stuck lines forming the supply passage 2 and the constant pressure passage 3.

Water is supplied to the supply passage 2 from a water source (not shown in the drawings). Water entering the passage 2 flows into the constant pressure passage 3 through the communicating hole 4 and is kept at a definite pressure in the passage 3. The water is then uniformly irrigated from the water-irrigating hole 5.

The irrigation hoses shown in FIGS. 1 to 7 and 9 are prepared by using one piece of thermoplastic resin film piled one upon the other as double thermoplastic resin film, but it will be understood that the hoses may be prepared by using, as the double film, two pieces of thermoplastic resin film placed one upon the other as shown in FIG. 10, double thermoplastic resin film formed by crashing a tubular film or the like.

The irrigation hose of the present invention has small melt-stuck portions in the vicinity of the communicating holes and/or water-irrigating holes. Accordingly, both the the supply passage and constant pressure passage have cross-sections (perpendicular to the longitudinal direction of hose) passing the small melt-stuck portions of different shape from cross-sections not passing the melt-stuck portions. This difference causes deformation of the wall of passage made of synthetic resin film, thereby facilitating opening of the communicating holes and water-irrigating holes. On use of the hose, therefore, both holes can easily be opened even by low water pressure, so that the hose can always be used with low water pressure. Consequently, the foregoing difficulties, for example, decreasing of the thickness of synthetic resin film by extension and the bursting of the film by high water pressure, do not occur. Also, since, the speed of water irrigated from the holes is lower, no adverse effect on crops occurs. Moreover, both holes open uniformly so that the amount of water supplied to the constant pressure passage from the supply passage is uniform, which makes the amount of water-irrigated more uniform. Since the irrigation hose of the present invention is made of a synthetic resin film, handling of the hose such as laying it down and putting it in order is easy as compared with irrigation hoses made of thick pipe, and it is inexpensive.

The irrigation hose of the present invention also has an added benefit. Since both holes open easily the hose has a self-cleaning function which is not true of conventional commercial irrigation hoses.

When an irrigation hose is used in agriculture, the irrigation water is generally supplied from rivers, ponds, wells and the like. Water from these sources generally contains suspended material such as dust or algae which adhere to and accumulate around the communicating holes causing them to gradually become smaller until they are finally blocked. When conventional hoses reach this condition, they should be cleaned by chemicals or detergents to remove the adhering material, or the material should be washed off with high-speed water under an uncommonly high pressure. Consequently, their life is shortened and they finally become unusable. In general, when hoses get blocked, pressure in the hoses rises. In the synthetic resin irrigation hose of the present invention, however, the communicating holes and water-irrigating holes are formed by non-melt-stuck portions made in the melt-stuck lines, and they are easily opened by the presence of the small melt-stuck portions in the vicinity of both holes. The area of cross-section of the holes becomes large by the slight rise in pressure caused by the small melt-stuck portions to allow much water to flow causing the and adhering and accumulating suspended material to be washed off by water. Thus, blockage of the holes is very easily broken. That is, the irrigation hose of the present invention has a self-cleaning function by which blockage of the holes is easily prevented without mechanical or chemical treatment. The life of the hose can therefore be prolonged.

In the irrigation hose of the present invention, the size and position of the small melt-stuck portions to made in the vicinity of the water-irrigating holes can properly be determined. In order to make the effect of the small melt-stuck portions more remarkable, however, the size and position are preferably determined as follows: The longitudinal (hereinafter, the term "longitudinal" means a longitudinal direction of the hose) dimension of the small melt-stuck portion is 0.5 to 3 times as long as that of the non-melt-stuck portion (i.e. a water-irrigating hole) in the outside melt-stuck line of the constant pressure passage; the position of the small melt-stuck portion is determined so that a part of the portion contacts with a circle at the outside, the radius of the circle being 0.5 to 2 times as long as the longitudinal dimension of the non-melt-stuck portion, and the center of the circle being at the inside end of the non-melt-stuck portion.

When the longitudinal dimension of the portion is less than 0.5 time as long, the effect of the portion is low. While when the dimension is more than 3 times as long, the portion largely hinders water flow, and, in the case of a long hose, uniformity of water-irrigation is lowered. When the radius is less than 0.5 times as long, opening of the water-irrigation hole becomes difficult. While when the radius is more than 2 times as long, the effect of the portion is small since the distance between the hole and the portion is too large.

The transverse dimension (perpendicular to the longitudinal direction) of the portion is not particularly limiting if the constant pressure passage is not intercepted by the portion. However, preferably it is 0.2 to 0.5 time as long as the transverse dimension of the non-melt-stuck portion. The shape of the portion does not diminish the effect thereof.

Figure 1:
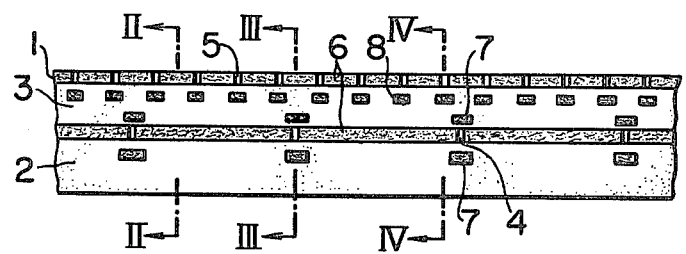
FIG. 1 is a plan view illustrating one example of the irrigation hose of the present invention.
Figure 2:
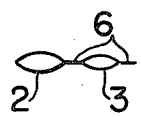
FIG. 2 is a cross-sectional view taken on line II—II of FIG. 1.
Figure 3:
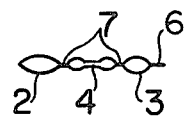
FIG. 3 is a cross-sectional view taken on line III—III of FIG. 1.
Figure 4:
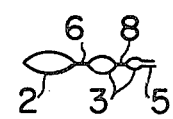
FIG. 4 is a cross-sectional view taken on line IV—IV of FIG. 1.
Figure 5:
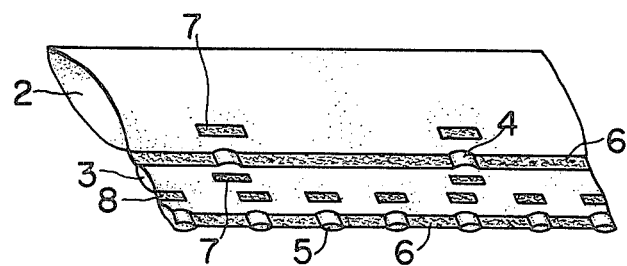
FIG. 5 is a perspective view of the irrigation hose of FIG. 1.
Figure 6:
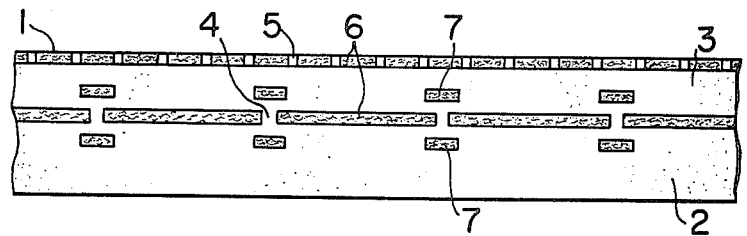
FIG. 6 is a plan view illustrating one example of the irrigation hose of the present invention in which small melt-stuck portions are made in the vicinity of the communicating holes in both the supply passage and the constant pressure passage.

In the irrigation hose of the present invention, the position of the small melt-stuck portion made in the vicinity of the communicating hole is in the supply passage or in both the supply passage and constant pressure passage. When the portion is positioned in both passages, the degree of opening becomes more uniform than in the other cases. FIG. 6 is a plan view illustrating one example of the irrigation hose in which small melt-stuck portions are provided in both passages.

In the irrigation hose of the present invention, the size and position of the small melt-stuck portion made in the vicinity of the communicating hole can properly be determined. In order to make the effect of the small melt-stuck portion more remarkable, however, the size and position are preferably determined as follows: The longitudinal dimension of the small melt-stuck portion is 3 to 15 times as long as that of the communicating hole; the position of the portion is determined so that a part of the portion contacts with a circle at the outside, the radius of the circle being 0.5 to 4 times as long as the longitudinal dimension of the hole, and the center of the circle being at the end of the hole facing the portion. When the longitudinal dimension of the portion is less than 3 times as long, the effect of the portion is low since the dimension is too short. While when the dimension is more than 15 times as long, the portion largely hinders water flow, and, in the case of a long hose, uniformity of water irrigation is lowered. When the radius is less than 0.5 time as long, opening of the communicating hole becomes difficult, while when the radius is more than 4 times as long, the effect of the portion is small since the distance between the hole and the portion is too large. The transverse dimension (perpendicular to the longitudinal direction) of the small melt-stuck portion is not particularly limiting if the supply passage is not intercepted by the portion. However, it is preferably 0.1 to 0.5 times as long as the transverse dimension of the supply passage. The shape of the portion does not diminish the effect thereof.

In the irrigation hose of the present invention, the communicating holes and water-irrigating holes may be made at any interval. In order to assure more uniform water-irrigating, however, the interval of the former holes is preferably 1 to 8 times that of the latter holes.

The length (dimension perpendicular to longitudinal direction) and the width (longitudinal dimension) of both holes are not particularly limiting. In order to assure a more uniform water-irrigating by a long hose, however, the ratio of width to length is preferably 0.5 to 5. The width of the communicating holes may properly be determined, but preferably it is 2 to 8 mm. When the width is less than 2 mm, the shape of the hole is similar to that of a hole made by drills or needles, and a change in the degree of opening is little for pressure in the passage. Consequently, a poor self-cleaning function results. On the other hand, when the width is more than 8 mm, the self-cleaning function is good, but the change in the degree of opening is too large for uniform water-irrigation. By making the hole of 2 to 8 mm in width, there is obtained an irrigation hose which is capable of displaying a sufficient self-cleaning function with no damage to the uniformity of water-irrigation.

The sizes of the supply passage and the constant pressure passage of the irrigation hose (the area of cross-section perpendicular to the longitudinal direction of the hose on using) are not particularly limiting, but preferably the size of the former passage is 1.5 to 4 times as large as that of the latter.

Figure 7:
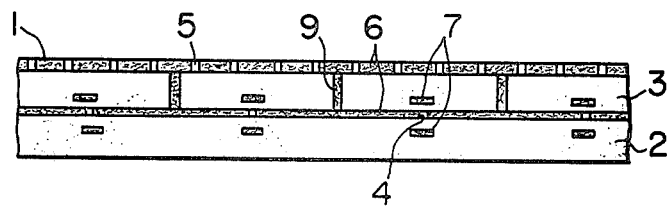
FIG. 7 is a plan view illustrating one example of the irrigation hose of the present invention in which barriers are made in the constant pressure passage.

Further, in using the irrigation hose of the present invention on a sloping field, the constant pressure passage may be provided with a barrier at proper intervals, as shown in FIG. 7, in order to improve the uniformity of water irrigation. In this case, it is desirable to determine the interval between barriers; so as to correspond to less than a 20 cm head, preferably a 5 to 10 cm head, of water on sloping ground. For example, when a hose of 50 m in length is used on sloping ground with a 1 m head of water, it is sufficient to form the barriers at a definite interval of less than 10 m. In order to make the barrier in the constant pressure passage, it is sufficient to carry out melt-sticking at proper intervals simultaneously with or after hose production. The longitudinal dimension of the barrier is not particularly limiting as long as it is large enough to intercept the constant pressure passage.

By complete interception of the constant pressure passage as described above, the amount of water irrigated from the compartments of the passage is small at a high-level side and large at a low-level side, showing a jagged diagram as shown in FIG. 8. This means that the uniformity of water irrigation is improved as compared with the constant pressure passage having no barriers. In order to further improve water-irrigation uniformity on sloping ground, it is sufficient to make a hole 10, which communicates the constant pressure passage, in a barrier 9 as shown in FIG. 9. By this method, water at the high-level side in the compartment passes through the hole 10 of the barrier 9 into the low-level side in the adjacent compartment. Thus, the jagged distribution of the amount of water-irrigation becomes even and an almost uniform distribution is obtained as shown in FIG. 8.

Another effect of the hole 10 in barrier 9 is to make it easy to put the hose in order. In the case of a hose having completely independent compartments in the constant pressure passage, water in the compartment is difficult to remove so that it takes a lot of time to put the hose in order. If the hose has a hole 10 is barrier 9, water in the supply passage is easily discharged at the end upon the winding of the hose since no barrier exists in the passage. The water in the constant pressure passage is also easily discharged at the end after successively passing through compartments and holes 10. In this way, the remaining water in the hose is easily discharged and the winding of the hose is also easily performed. Moreover, since the diameter of a roll of hose is small, a large space is not required for putting the roll in order.

In order to increase the effect provided by holes 10, the area of cross-section of the holes 10 is 1/5 to 1/30, preferably 1/10 to 1/20, of that of the constant pressure passage. When the area is less than 1/30, resistance is too large for easy water flow so that the effect of the hole is small. While when the area is more than 1/5, the effect of the barrier 9 in intercepting the constant pressure passage is poor.

In the irrigation hose of the present invention, the supply passage and constant pressure passage are arranged on the same plane. When the hose has three passages, the passages are arranged so that the middle passage is a supply passage and the both outside passages are constant pressure passages (FIG. 10), or one of the outside passages is a supply passage and the rest are constant pressure passages. In either case, the small melt-stuck portion, the barrier in the constant pressure passage and the hole in the barrier are made in the same manner as in the 2-passage hose described above.

As the material for the irrigation hose of the present invention, any of thermoplastic synthetic resins may be used. Of these, however, polyolefin resins such as polyethylene, ethylene-vinyl acetate copolymers, propylene and the like are preferred. The thickness of film is generally less than 0.5 mm, but preferably it is 0.05 to 0.3 mm to provide good handling and mechanical strength.

The irrigation hose of the present invention may be produced by any method. For example, it may be produced by subjecting double thermoplastic synthetic resin film to melt-sticking along the longitudinal direction using a hot roll having grooves on its surface and a hot roll having projections on its surface. The communicating holes and water-irrigating holes are formed by the grooves on the roll surface, and the small melt-stuck portions are formed by the projections.

What is claimed is:

1. In an irrigation hose which is produced by melt-sticking a double layer thermoplastic resin film in a plane along longitudinal parallel lines so as to form at least two passages, one of said passages being a constant pressure passage and the other being a supply passage, said supply passage and constant pressure passage being connected by first communicating holes which are formed by first non-melt-stuck portions of said film spaced in a melt-stuck line provided between the supply passage and the constant pressure passage, said constant pressure passage having water-irrigating holes which are formed by second non-melt-stuck portions of said film spaced in an outside melt-stuck line defining a boundary of said constant pressure passage, the improvement which comprises providing first small melt-stuck portions in said film in the vicinity of said water-irrigating holes, the dimension in the longitudinal direction of the hose of each of said first small melt-stuck portions being 0.5 to 3 times as long as the dimension of said water-irrigating holes in the longitudinal direction of said hose, said first small melt-stuck portions being located so that a peripheral portion of each first small melt-stuck portion contacts with a circle having a radius which is 0.5 to 2 times as long as the dimension of said water-irrigating holes in a longitudinal direction of said hose, the center of said circle being at the inside end of an associated second non-melt-stuck portion of said film forming a said water-irrigation hole.

2. The irrigation hose according to claim 1, wherein said constant pressure passage is intercepted at intervals by barriers formed by second small melt-stuck portions.

3. The irrigation hose according to claim 2, where a second communicating hole is provided in each said barrier.

4. The irrigation hose according to claim 3, wherein the cross-sectional area of said second communicating hole provided in each said barrier is 1/5 to 1/30 of that of the constant pressure passage.

5. The irrigation hose according to claim 1, wherein second small melt-stuck portions are provided in the vicinity of said first communicating holes in the supply passage.

6. The irrigation hose according to claim 1, wherein second small melt-stuck portions are provided in the vicinity of said first communicating holes in the constant pressure passage.

7. The irrigation hose according to claim 1, wherein second small melt-stuck portions are provided in the vicinity of said first communicating holes in both the constant pressure and supply passages.

8. The irrigation hose according to claims 5, 6 or 7, wherein the dimension in the longitudinal direction of the hose of said second small melt-stuck portion is 3 to 15 times as long as the longitudinal dimension of said communicating holes, said second small melt-stuck portion being located so that a peripheral portion of each of said second small melt-stuck portions contacts with a circle having a radius which is 0.5 to 4 times as long as the longitudinal dimension of an associated first communicating hole, the center of said circle being at the end of the said associated communicating hole facing said second small melt-stuck portion.

* * * * *